(No Model.) 2 Sheets—Sheet 1.

H. OHL.
CHEESE MAKING DEVICE.

No. 537,226. Patented Apr. 9, 1895.

Witnesses
Geo. W. Young
J. W. Saumberger

Inventor
Heinrich Ohl
By H. G. Underwood
Attorney (No Model.) 2 Sheets—Sheet 2.
H. OHL.
CHEESE MAKING DEVICE.
No. 537,226. Patented Apr. 9, 1895.
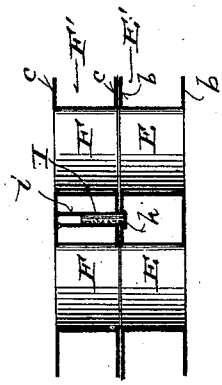
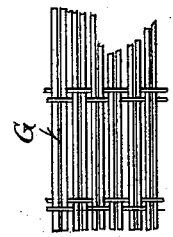
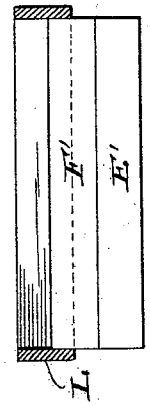
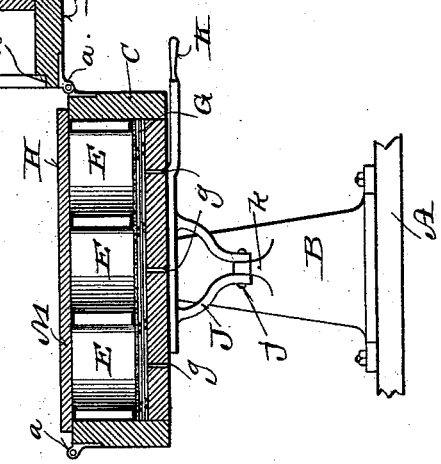
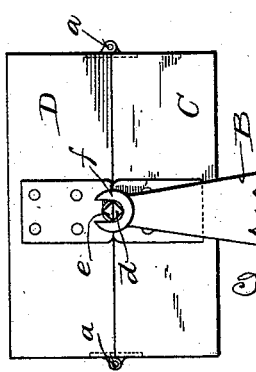

UNITED STATES PATENT OFFICE.

HEINRICH OHL, OF BABENHAUSEN, GERMANY.

CHEESE-MAKING DEVICE.

SPECIFICATION forming part of Letters Patent No. 537,226, dated April 9, 1895.

Application filed December 14, 1893. Serial No. 493,633. (No model.) Patented in Germany April 30, 1892, No. 66,853; in France August 8, 1892, No. 223,549; in Switzerland August 8, 1892, No. 5,516, and in Belgium August 16, 1892, No. 101,032.

*To all whom it may concern:*

Be it known that I, HEINRICH OHL, a subject of the German Emperor, and a resident of Babenhausen, in the Grand Duchy of Hesse, Germany, have invented certain new and useful Improvements in Cheese-Making Devices, (for which I have already obtained Letters Patent in the following-named countries, viz: Germany, dated April 30, 1892, No. 66,853; Switzerland, dated August 8, 1892, No. 5,516; France, dated August 8, 1892, No. 223,549, and Belgium, dated August 16, 1892, No. 101,032;) and I do hereby declare that the following is a full, clear, and exact description thereof.

My invention relates to the manufacture of cheese, especially such as is called full-milk-cheese, or cream-cheese and will be fully described hereinafter and subsequently claimed.

Figure 1:
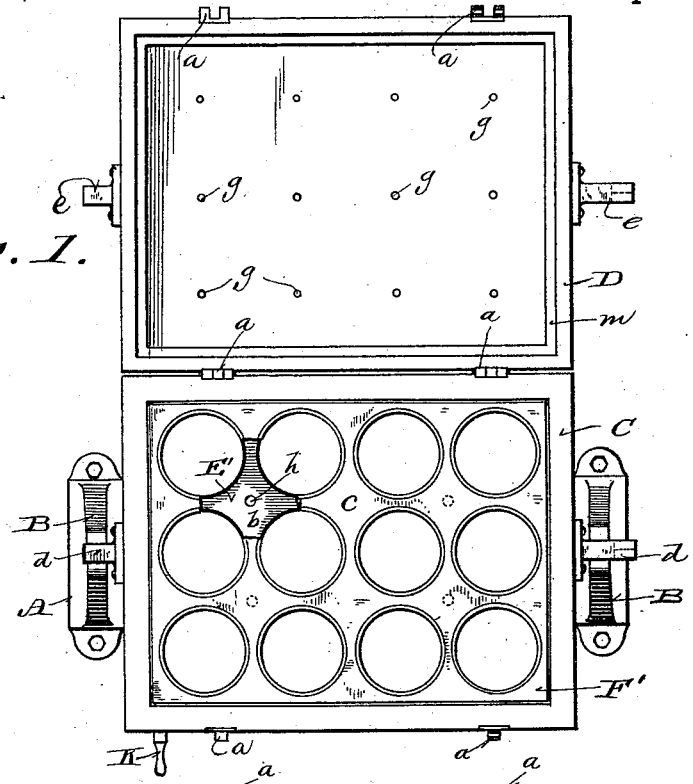
Figure 2:
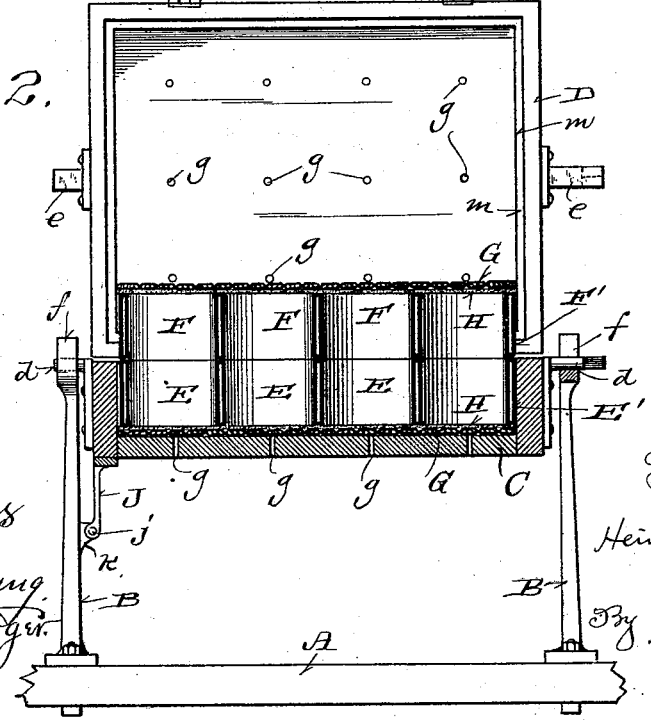

In the drawings, Figure 1 is a plan view of my cheese making device, with the cover thrown open, partly broken away to illustrate details of construction. Fig. 2 is a vertical central sectional view of the device, with the cover raised. Fig. 3 is a transverse vertical sectional view with the device in the same position as in Fig. 2, but with the upper milk cylinders removed and a board substituted therefor. Fig. 4 is a detail side view. Fig. 5 is a detail sectional view. Fig. 6 is a detail view of the straw-matting. Fig. 7 is a detail view of the milk-cylinder sections, with the filling frame in position on the upper section, said frame being shown in section.

A represents a base or platform, and B B supports or standard rising therefrom.

C represents a case, and D its cover, these parts being hinged together, as shown at $a\ a$, the said hinges having removable pintles or bolts.

E E and F F represent milk cylinders, open at each end and arranged in upper and lower series, all the cylinders in each series being united by upper and lower sealing plates $b\ b$ and $c\ c$, coming just flush with the tops and bottoms of the said cylinders, but not covering their open ends, so that all the cylinders E E with their sealing plates $b\ b$ may form one section, E', and all the cylinders F F with their sealing plates $c\ c$, another section, F'. In the form shown there are twelve of the cylinders in each section, but the number may be more or less, and in large devices there may be any number of sections, arranged side by side, each containing a given number of cylinders, which sections are also preferably sealed on all sides.

The case has, on each side, a half journal $d\ d$ the flat surfaces of which engage the corresponding flat surfaces of the half journals $e\ e$ projecting from the cover part, D, said journals resting in suitable bearings $f\ f$ in the standards or supports B B, the journals on one side projecting beyond the bearings and being preferably squared or shaped to receive a crank or pulley for turning the case when in a closed position, as best shown in Fig. 4. The case and cover are each provided with series of draining holes $g\ g\ g$ as shown.

G G represent strips of straw-matting, and H H strips of cheese-cloth or similar coarsely woven fabric. Sockets or holes $h$ are formed in the upper sealing strip $b$ of the lower cylinder-section E' to register with socket-tubes $i$ in the upper cylinder-section F', to receive pins I, as best shown in Fig. 5, for a purpose hereinafter explained.

J is a bracket pivoted as shown at $j$ to a lug $k$ on one of the standards B, said bracket being provided with a handle K.

The operation of my device is as follows: When it is desired to fill the cylinders, the cover D is thrown back and the case C brought to a horizontal position, and so maintained by the frictional contact of the bottom of the case with the top of the bracket J, swung up to position as shown in Figs. 2 and 3. Then a layer of straw-matting G is placed on the bottom of the case, and above this a layer of fabric H, and on the latter the lower cylinder-section E' is placed, pins I being dropped into the described sockets or holes $h$ in the top sealing plate $b$ of said section, and then the upper cylinder-section F' is put on, the socket-tubes $i$ receiving the pins I and thereby insuring a perfect registration of the open cylinders F F of the upper section with the open cylinders E E of the lower section. If preferred, these pins I may be made fast to one of the sections. A rectangular frame L is then fitted to the top of the upper section (as shown in Fig. 7) and milk which has been thickened by heat or converted to a "clabbered" condition (that is, a mixture of curds and whey) is poured into the space within the sides of said frame, which fits tightly to the section F' and by this means the clabbered milk quickly finds its way to, and fills up, the united cylinders F E. There the frame L is removed, and a layer of cloth H placed upon the upper cylinder-section, and a layer of straw-matting G, upon that, and the cover D brought down over all, and the pintles replaced in the hinges on the just open side, thereby locking the device as shown in Fig. 4. Then by means of the crank, or pulley, hereinbefore referred to, power is applied to the journal $d\ e$, (the bracket J being, of course dropped) and the case and cover C D revolved until all the whey and water are expelled from the cylinders E F, out through the fabric H, matting G, and holes $g\ g$ in the said case and cover, leaving only the curds which can then all be contained in the cylinders of one of the sections. The upper cylinder-section F' is therefore removed (the bracket J being again brought up to steady the case C) and a board M placed on top of the lower cylinder-section E' (whose cylinders E E now contain all of the curds) and the cover D is again closed (said cover being provided with a continuous groove or rabbet $m$ to receive said board) and locked, and the case and contents being allowed to stand the proper time to convert the curds into cheese, the device being turned as often as necessary.

In the foregoing description I have referred to the milk containing parts E E and F F as "milk-cylinders," but while I ordinarily prefer to make these parts cylindrical as shown in the drawings, I do not wish to confine myself to any especial shape of said parts.

Having thus described my invention, what I claim as new, and desire to secure by Letters Patent, is—

1. In a cheese-making device the combination of a revoluble perforated case, a series of removable sections contained therein, containing open-ended milk-cylinders registering with each other, and strips of fabric, and straw-matting interposed between said cylinder-sections and the perforated sides of said case, substantially as set forth.

2. In a cheese-making device, the combination of a revoluble perforated case, a removable cylinder-section, comprising open ended cylinders and sealing plates flush therewith and united thereto and having holes or sockets in one of said plates, a like cylinder-section with socket-tubes in one of its plates, and removable pins fitting in said sockets and socket-tubes, substantially as set forth.

3. In a cheese-making device, the combination of a suitable base or platform, standards or supports rising therefrom and having bearings in their upper ends, a revoluble case having journals resting in said bearings, and a pivoted gravity controlled bracket, secured to one of said standards and adapted for frictional engagement with said case when said bracket is in a raised position, and to be free from engagement therewith when said bracket is dropped to permit the continuous revolution of the case, substantially as set forth.

4. In a cheese-making device, the combination of a perforated case, adapted for continuous revolution, series of removable milk-cylinder sections contained in said case and comprising open-ended and close-walled cylinders rigidly connected together with spaces between their adjacent outer walls, and held in said case so that all the cylinders of one section shall register with the cylinders of the other section, and each section having sealing plates flush with one end of the said cylinders, covering said spaces between the cylinders of said section, and arranged so that the sealing plates of one section shall abut against those of the other section, substantially as set forth.

5. In a cheese-making device, the combination of a suitable supporting frame, a perforated case adapted for continuous revolution in said frame, and a series of open ended and close-walled milk cylinders secured together in sections and removably supported in said case, substantially as set forth.

In testimony that I claim the foregoing I have hereunto set my hand, at Babenhausen, Hesse, Germany, in the presence of two witnesses.

HEINRICH OHL.

Witnesses:
PETER ABT,
JEAN GRUND.